United States Patent [19]
Diamond

[11] 3,899,269
[45] Aug. 12, 1975

[54] ROTARY POWER DEVICE

[76] Inventor: Morris B. Diamond, 201 Highland Ave., Apt. A5, Highland Park, Mich. 48203

[22] Filed: Aug. 20, 1973

[21] Appl. No.: 370,956

[52] U.S. Cl. ................................ 418/35; 123/8.47
[51] Int. Cl. .................................... F02b 53/00
[58] Field of Search ........... 123/8.09, 8.47; 418/33, 418/35; 74/665 K

[56] References Cited
UNITED STATES PATENTS

| | | | |
|---|---|---|---|
| 1,394,870 | 10/1921 | Thomas | 74/665 K X |
| 2,253,445 | 8/1941 | Shufeldt | 123/8.47 |
| 2,852,007 | 9/1958 | Bancroft | 123/8.09 X |

Primary Examiner—William L. Freeh
Assistant Examiner—Michael Koczo, Jr.
Attorney, Agent, or Firm—Alfred E. Wilson

[57] ABSTRACT

A rotary power device comprised generally of a toroidal housing providing a toroidal cylinder chamber, a drive shaft extending through the central hole in the housing which is inclined at a predetermined angle thereto, at least one pair of rotors, rotatable within the central hole of the housing about the shaft, each connecting to at least one piston, slidably disposed in the toroidal cylinder, and links connecting between the drive shaft and each of said rotors. The toroidal cylinder provides an air or combustible mixture intake chamber, a compression chamber, a fuel injection chamber and a firing chamber and an exhaust chamber.

5 Claims, 3 Drawing Figures

PATENTED AUG 12 1975

3,899,269

SHEET 1

ROTARY POWER DEVICE

BACKGROUND OF THE INVENTION

The present invention provides a new concept in rotary power device such as rotary engines which are capable of extracting a maximum amount of power out of a given amount of fuel and reduces pollution to a minimum.

A toroidal cylindrical chamber is provided in a toroidal housing, said housing being inclined at a predetermined angle to a drive shaft extending through the center hole thereof. A pair of generally annular, side-by-side rotors are rotatably journaled about the inner periphery of the toroidal housing, each connecting to at least one piston, slidably disposed within the toroidal cylinder. Angular or curved link means connect between the drive shaft and the respective rotors.

In a preferred form of the present invention a toroidal cylinder is provided with four chambers defined by four pistons which rotate with the rotors. Two pistons, spaced 180° apart, are connected to each rotor, thus providing four power impulses for each 360° of rotation of the drive shaft. Because of the inclined relationship of the toroidal cylinder to the drive shaft, the two pistons carried by each rotor go through two periods of relatively slow movement. When the one pair of pistons, carried by one rotor is moving rapidly, the other pair of pistons, carried by the second rotor, is moving relatively slowly. The necessary displacement is therefore provided for compression purposes.

The fuel injection and ignition stage of the rotary engine of the present invention is provided for each piston at the start of its most rapid movement in contrast with the conventional reciprocating engine wherein ignition occurs at the point of slowest movement.

In the reciprocating engine, the conversion of linear reciprocating motion, by means of the connecting rod and crankshaft arrangement, is inherently wasteful of the energy supplied by the combustion process. During the power stroke, as the piston pulses on the piston rod, the crank and crankshaft move through approximately 180°. When the firing occurs and the piston begins to travel, the crank is near its inward dead center position, and virtually none of the forces applied to the piston are transmitted to the crankshaft. The transmitted forces actually reach a maximum when the crank is at right angles to the piston axis, that is, when the piston is about half way down in the cylinder, then the forces decrease again. As a result, the energy transmitted to the crankshaft is only a small fraction of the total energy produced by the combustion process.

When the time of combustion is shifted away from the hot top dead center, such as occurs in a conventional reciprocating engine, to the relatively much cooler, faster moving stage of piston travel, as provided by the present invention, combustion takes place in a much cooler environment, so less oxides of nitrogen are produced. In the conventional engine, where combustion takes place at extremely high temperatures, oxides of nitrogen are prolifically produced (high temperatures are conducive to the production of oxides of nitrogen). Temperatures get extremely high at top dead center because the fuel ignition takes place while the piston is moving the slowest, and the heat from the combustion piles up because compression is increasing tremendously because of the slow moving piston. In the rotary engine of the present invention, the piston is moving at the fastest rate, when combustion occurs, preventing the heat pile-up.

Another result of providing ignition at the fastest rate of piston movement is that lower octane fuel can be used at higher compression ratios. The piston is moving at a rapid rate of speed when ignition occurs and the power from the products of combustion is like a powerful but gentle push on the piston. Knock is caused when a slow moving piston receives hammer-like blows from the fast moving flame front. Lead is used to slow down this flame front, but in the rotary engine of the present invention, the flame front gets no chance to knock on the fast moving piston.

DETAILED DESCRIPTION OF THE DRAWINGS

Figure 1:
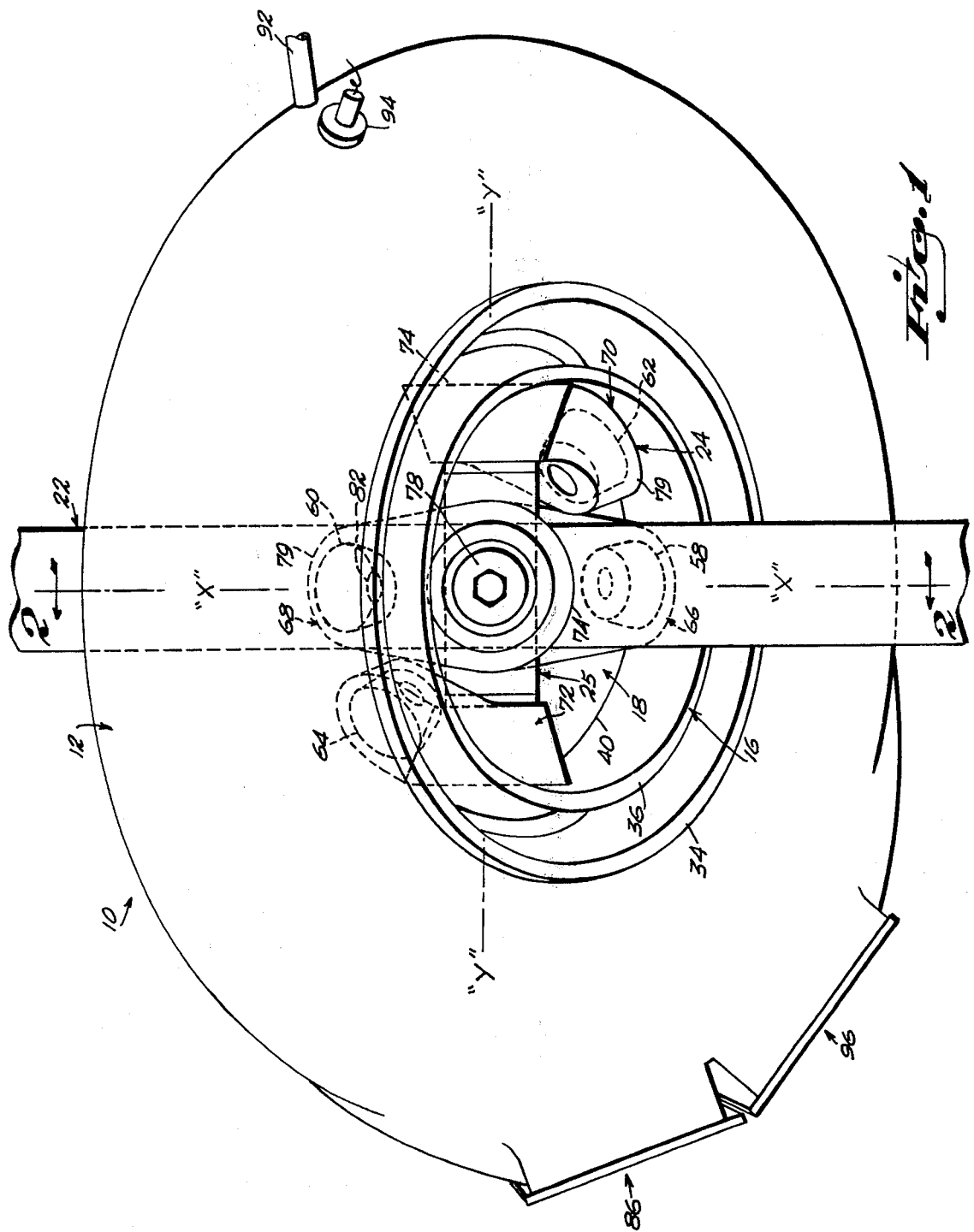
FIG. 1 is a semi-schematic top plan view of the rotary engine of the present invention.

With reference to the drawings, in which like reference numerals designate like or corresponding parts throughout the several views, the numeral 10 designates the rotary engine of the present invention. The engine 10 is comprised generally of a toroidal housing 12, providing a toroidal cylinder 14, a pair of rotors 16 and 18 rotatably journaled within the central hole 20 of the toroidal housing 12 in driving connection with a drive shaft 22 by link means 24, pivotally connected between the respective rotors 16 and 18 and a generally ring-shaped member 25, fixed to the drive shaft 22.

Figure 2:
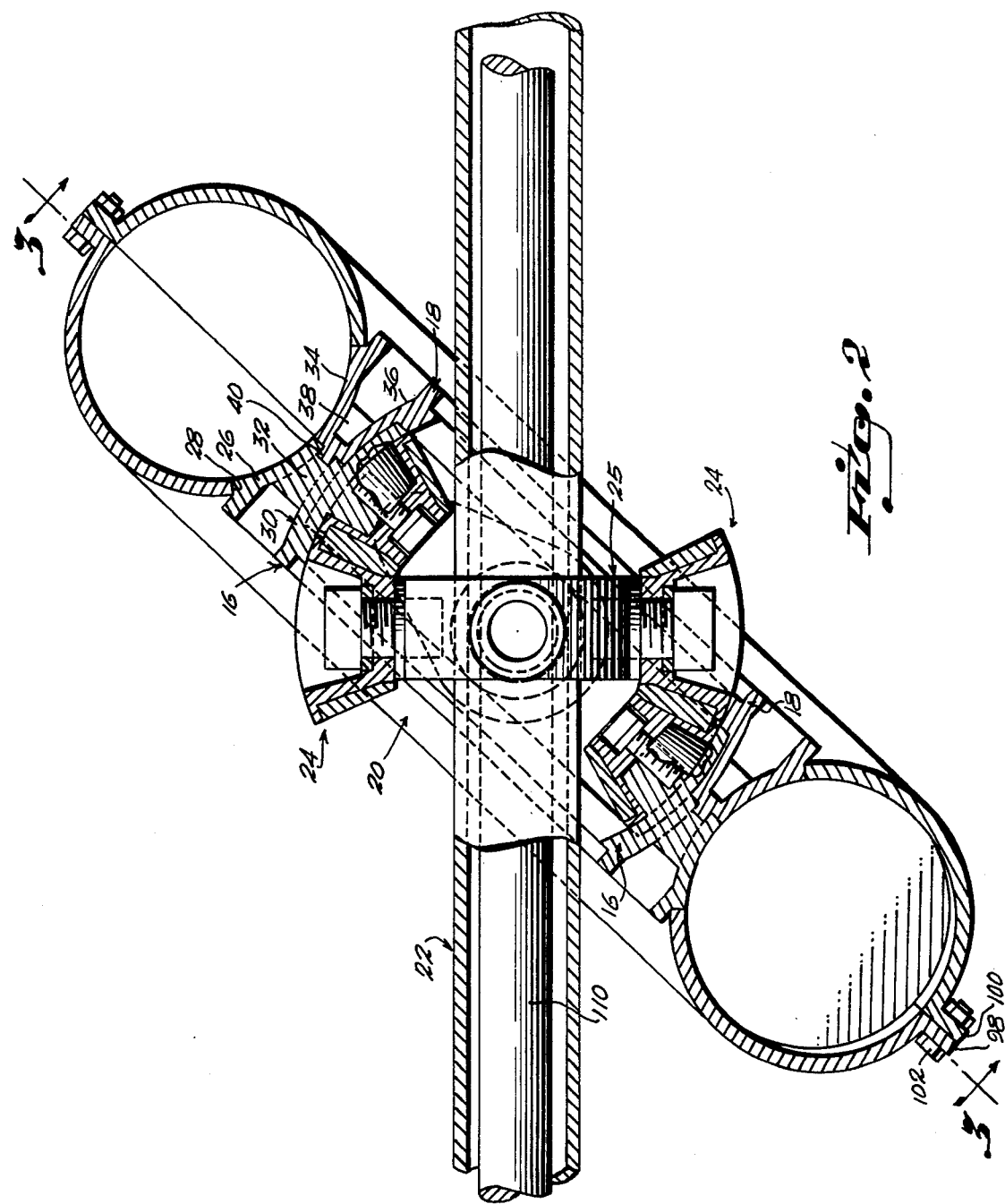
FIG. 2 is a vertical cross-sectional view taken along the line 2—2 of FIG. 1.

As best illustrated in FIGS. 1 and 2, the housing 12 is inclined relative to the drive shaft 22 which extends horizontally through the centrally journaled rotors 16 and 18, and the toroidal housing 12. The first rotor 16 includes an outer annular, convex portion 26 as seen from the inside (FIG. 2) rotatably journaled in a first side portion of an annular guide slot 28 about the inner periphery of the housing 12 and an inner, annular concave portion 30, connected at 32 to the outer portion 26.

The rotor 18 includes an outer annular convex portion 34, rotatably journaled in a second side portion of the annular guide slot 28 in the toroidal housing 12, and an inner annular concave portion 36 connected at 38 to the outer portion 34. With reference to FIG. 2, the inner portions 30 and 36 of the rotors 16 and 18 are rotatably journaled relative to each other as by a central annular tongue and groove interconnection 40.

Figure 3:
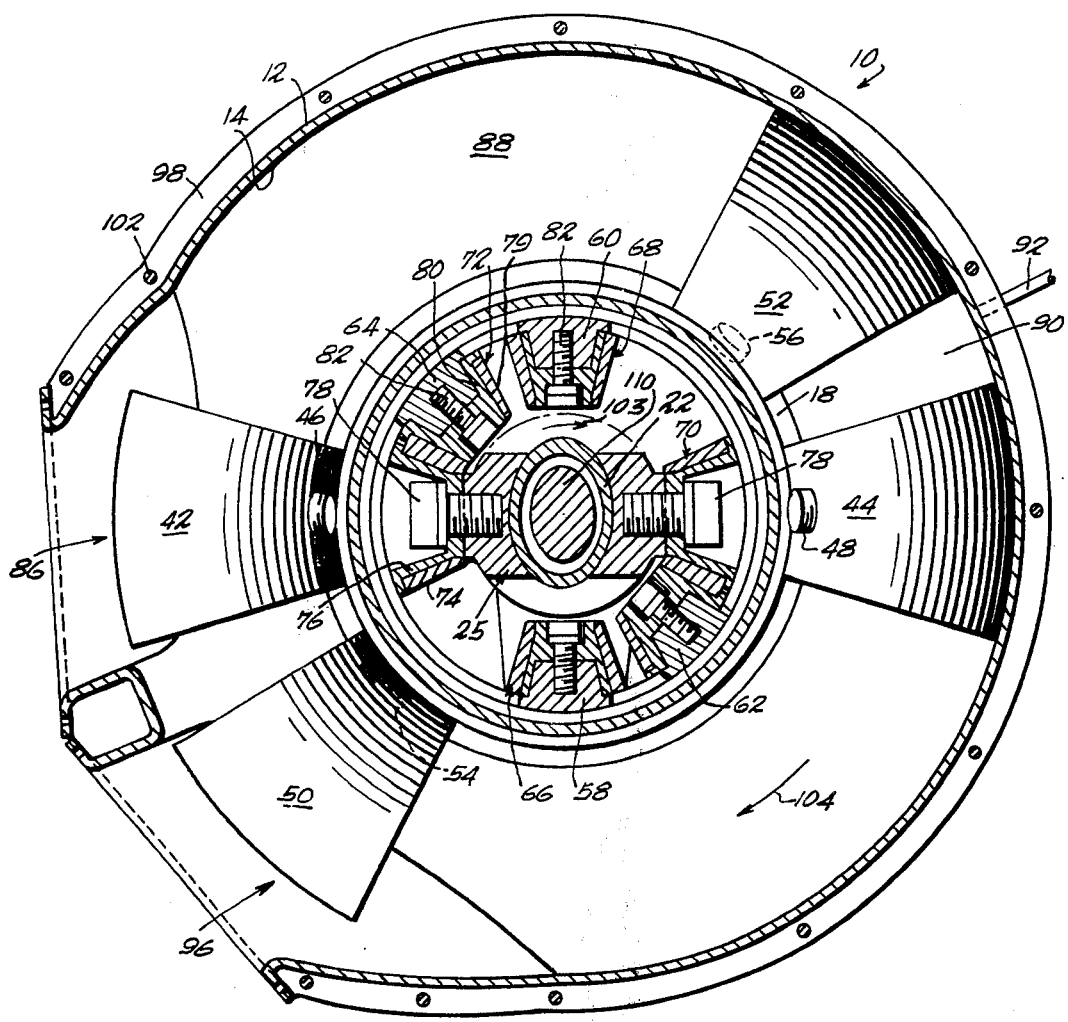
FIG. 3 is a cross-sectional view taken along the line 3—3 of FIG. 2.

As best illustrated in FIG. 3, a first pair of pistons 42 and 44 are slidably disposed in the toroidal cylinder 14 and include mounting means such as the threaded studs 46 and 48 whereby said first pair are fixed to the first rotor 16 in a diametrically opposed relation.

In a like manner, a second pair of diametrically opposed pistons 50 and 52 are fixed by threaded studs 54 and 56 to the second rotor 18. The threaded studs 46, 48, 54 and 56 are threaded to the respective rotors on opposite sides of the center.

Each rotor 16 and 18 provides a pair of diametrically opposed, radially inwardly extending pins 58, 60, 62 and 64 respectively. The pistons 42 and 44 carried by the first rotor 16 are disposed at a predetermined number of degrees relative to the pins 58 and 60 and the pistons 50 and 52 carried by the second rotor 18 are similarly disposed relative to the pins 62 and 64.

Four angular or curved links 66, 68, 70 and 72 connect between the respective pins 58, 60, 62 and 64 and the ring member 25, fixed to the drive shaft 22, at respective 90° intervals thereabout. Each link 66, 68, 70 and 72 includes a first end 74 engaged over an appropriately cup-shaped bearing member 76, bolted at 78 to the ring 25, and a second end 79 engaged over a similar bearing member 80, bolted at 82 to one of the pins 58, 60, 62 and 64.

The toroidal cylinder 14 provides an air or gas mixture intake chamber 86, a compression chamber 88, a fuel injection and ignition chamber 90 which may be provided with a fuel inlet 92 and a spark plug 94, and an exhaust chamber 96. As illustrated in FIGS. 2 and 3, the housing may be formed in two pieces, providing outer peripheral flanges 98 and 100, bolted together at 102.

The cycle of operation is as follows: assuming the respective pairs of pistons 44 and 52, and 42 and 50 are positioned in close proximity to each other as best illustrated in FIG. 3, air has been compressed between the pistons 44 and 52 and fuel injected into the chamber 90 therebetween and simultaneously fired by the spark plug 94. The direction of rotation of the drive shaft 22 is indicated by the arrow 104 and the expansion of gases in the chamber 90 drives the piston 44 in the direction of the arrow 104 at a very rapid rate of speed because of the relationship of the angular link 68 to the drive shaft 22, caused by the inclined attitude of the toroidal cylinder relative to the drive shaft 22.

Rapid movement of the piston 44 imparts a like movement to piston 42 because both pistons are fixed to the first rotor 16 as previously described. As best seen in FIG. 1, a common center plane "x-x" through the pins 58 and 60 and their connecting links 66 and 68 is generally co-planar in a vertical plane with the axis of the drive shaft 22 while a center plane through the pins 62 and 64 and their connecting links 70 and 72 is generally co-planar with a center plane through the toroidal cylinder 14. Therefore, when the pistons 44 and 42 are moved respectively to the positions of pistons 50 and 52, the connecting bolts 78 of the links 66 and 68 to the connector ring 25 will be in said vertical plane x-x and will have been rotated through an arc of approximately 90 degrees to impart a similar 90 degree rotation to the drive shaft 22 while the pistons will actually move through an arc of 127°.

At the same time, the connecting ring bolts 78 to the links 72 and 70 will be rotated through 90°, however, the pins 62 and 64 connecting the respective links 70 and 72 to the second rotor 18 will rotate through 53°. As the pistons 50 and 52 are carried by the rotor 18, they likewise rotate 53 degrees to assume the positions of the pistons 42 and 44.

The above description applies to one power impulse providing 90 degrees of rotation. As each piston 42, 44, 50 and 52 successively assumes each of the four positions illustrated in FIG. 3 during each 360 degrees of rotation, four power impulses will occur during each rotation of the drive shaft.

In simple terms, the bolts 78, connecting the first ends 74 of the angular or curved links 66, 68, 70 and 72 to the ring 25, rotate in a vertical plane "y-y" at right angles to the vertical plane x-x through the axis of the drive shaft 22. However, the second end 79 of each link moves outward relative to each side of plane y-y during each 360° of rotation thereof. This results in each piston successively moving at an accelerated rate of speed at the beginning of its power impulse in chamber 90, then gradually slowing as said piston progresses to the end of the exhaust chamber 96, moving relatively slowly through the beginning of the intake chamber 86, then rapidly through the major portion of the compression chamber 88 and then slowing in its movement at the end thereof until it reaches the beginning of its next power stroke when it again reaches its maximum rotational speed. Therefore, the power of combustion is transferred to the drive shaft at the time when the lever action of each angular or curved link provides the greatest degree of mechanical advantage and efficiency.

It should be noted that the aforementioned degree of movement of the pistons during one cycle are by way of example only. In its basic form, the rotary engine of the present invention would provide only one piston, 44 and 52 for example, fixed to each rotor 16 and 18. Any type of conventional housing or closure can be provided for the engine, and the toroidal shaped housing defining the toroidal cylinder would be fixed thereto. The main drive shaft 22 may be of tubular form with a secondary drive shaft 110 extending axially therethrough. In this manner a primary drive shaft is provided to a gear box, for example, and a secondary drive is provided back through the rotary engine to the other side thereof. By reversing the drive, that is by putting power into the shaft 22, the rotary power device is operable as a compressor or pump.

While a preferred form of the present invention has been herein illustrated and described, it will be apparent to those skilled in the art that various changes and modifications can be made therein without departing from the true spirit of the invention as defined in the appended claims.

I claim:

1. A rotary power device comprising:
   a. a main drive shaft;
   b. a toroidal housing disposed about said drive shaft in an inclined plane at a predetermined angle relative to said drive shaft;
   c. a toroidal cylinder, formed in said toroidal housing, in said inclined plane;
   d. first and second rotors, individually, rotatably mounted in said inclined plane in the central hole defined by said toroidal housing;
   e. means to link said drive shaft to the respective rotors; and including,
      1. first pivot means, radially extending from said main drive shaft,
      2. second pivot means connecting to said first and second rotors, and
      3. link means pivotally connecting between said first and second pivot means;
   f. piston means, disposed in said toroidal cylinder, connected to each of said rotors.

2. A rotary power device as defined in claim 1 including a ring member fixed to said main drive shaft with said first pivot means being formed integral therewith.

3. A rotary power device comprising:
   A. a main drive shaft;
   B. a toroidal housing disposed about said drive shaft in an inclined plane at a predetermined angle relative to said drive shaft;

C. a toroidal cylinder, formed in said housing, in said inclined plane;
D. first and second rotors, individually, rotatably mounted in said inclined plane in the central hole defined by said toroidal housing;
E. means to link said drive shaft to the respective rotors including,
1. first pivot means radially extending from said main drive shaft in a plane at right angles to the axis thereof,
2. second pivot means connecting to said first and second rotors having axes in said inclined plane, and
3. link means pivotally connecting between said first and second pivot means;
F. piston means, disposed in said toroidal cylinder, connected to said rotors.

4. A rotary power device comprising:
A. a main drive shaft;
B. a toroidal housing disposed about said drive shaft in an inclined plane at a predetermined angle relative to said drive shaft;
C. a toroidal cylinder, formed in said housing in said inclined plane;
D. first and second rotors, individually, rotatably mounted in said inclined plane in the central hole defined by said toroidal housing;
E. means to link said drive shaft to the respective rotors, including,
1. first pivot means, radially extending from said main drive shaft comprising,
   a. four pivoted connections, spaced at 90° intervals about said drive shaft, to respective first ends of four appropriately configurated links, comprising said link means;
2. second pivot means connecting between said first and second rotors and the respective second ends of said links;
F. piston means, disposed in said toroidal cylinder, connected to said rotors, 5. A rotary power device comprising:
A. a main drive shaft;
B. a toroidal housing disposed about said drive shaft in an inclined plane at a predetermined angle relative to said drive shaft;
C. a toroidal cylinder, formed in said housing, in said inclined plane;
D. first and second rotors, individually, rotatably mounted in said inclined plane in the central hole defined by said toroidal housing;
E. means to link said drive shaft to the respective rotors including,
1. first pivot means, radially extending from said main drive shaft in a plane at right angles to the axis thereof,
2. second pivot means connecting to said first and second rotors comprising,
   a. four pivotal connections, two to each of said first and second rotors, spaced 180 degrees apart on the respective rotors,
3. link means pivotally connecting between said first pivot means and four pivotal connections;
F. piston means, disposed in said toroidal cylinder, connected to said rotors.

* * * * *